United States Patent
Wister et al.

(10) Patent No.: US 12,136,228 B1
(45) Date of Patent: Nov. 5, 2024

(54) SYSTEMS AND METHODS FOR SHAPE CLASSIFICATION OF THE HUMAN FIGURE FOR APPAREL RECOMMENDATIONS

(71) Applicant: Revshopp, Inc., Sacramento, CA (US)

(72) Inventors: Amy Wister, Sacramento, CA (US); Subbu Balakrishnan, Los Altos, CA (US)

(73) Assignee: Revshopp, Inc., Sacramento, CA (US)

( * ) Notice: Subject to any disclaimer, the term of this patent is extended or adjusted under 35 U.S.C. 154(b) by 417 days.

(21) Appl. No.: 17/569,482

(22) Filed: Jan. 5, 2022

Related U.S. Application Data

(60) Provisional application No. 63/134,292, filed on Jan. 6, 2021.

(51) Int. Cl.
| | |
|---|---|
| *G06Q 30/00* | (2023.01) |
| *G06Q 30/0601* | (2023.01) |
| *G06T 7/50* | (2017.01) |
| *G06T 7/60* | (2017.01) |
| *G06V 40/10* | (2022.01) |

(52) U.S. Cl.
CPC ........... *G06T 7/50* (2017.01); *G06Q 30/0631* (2013.01); *G06T 7/60* (2013.01); *G06V 40/103* (2022.01); *G06T 2207/30196* (2013.01)

(58) Field of Classification Search
None
See application file for complete search history.

(56) References Cited

U.S. PATENT DOCUMENTS

| | | | |
|---|---|---|---|
| 2008/0235114 A1* | 9/2008 | Wannier | A41H 3/007 705/26.7 |
| 2010/0151430 A1* | 6/2010 | Jones | G06Q 30/06 434/322 |
| 2020/0375293 A1* | 12/2020 | Koh | G06Q 30/0641 |
| 2021/0049811 A1* | 2/2021 | Fedyukov | G06T 7/60 |

* cited by examiner

*Primary Examiner* — Mila Airapetian
(74) *Attorney, Agent, or Firm* — O'BANION & RITCHEY LLP; John P. O'Banion

(57) ABSTRACT

Systems and methods are described for objectively determining the shape category of a human figure using a vertical visual frame of comparative reference. A geometric guideline is provided as an overlay that is applied to an image of a human body whereby the body is categorized into a shape cohort (type). The shape categories can be used for various purposes, such as recommending and fitting apparel for online purchases.

21 Claims, 6 Drawing Sheets

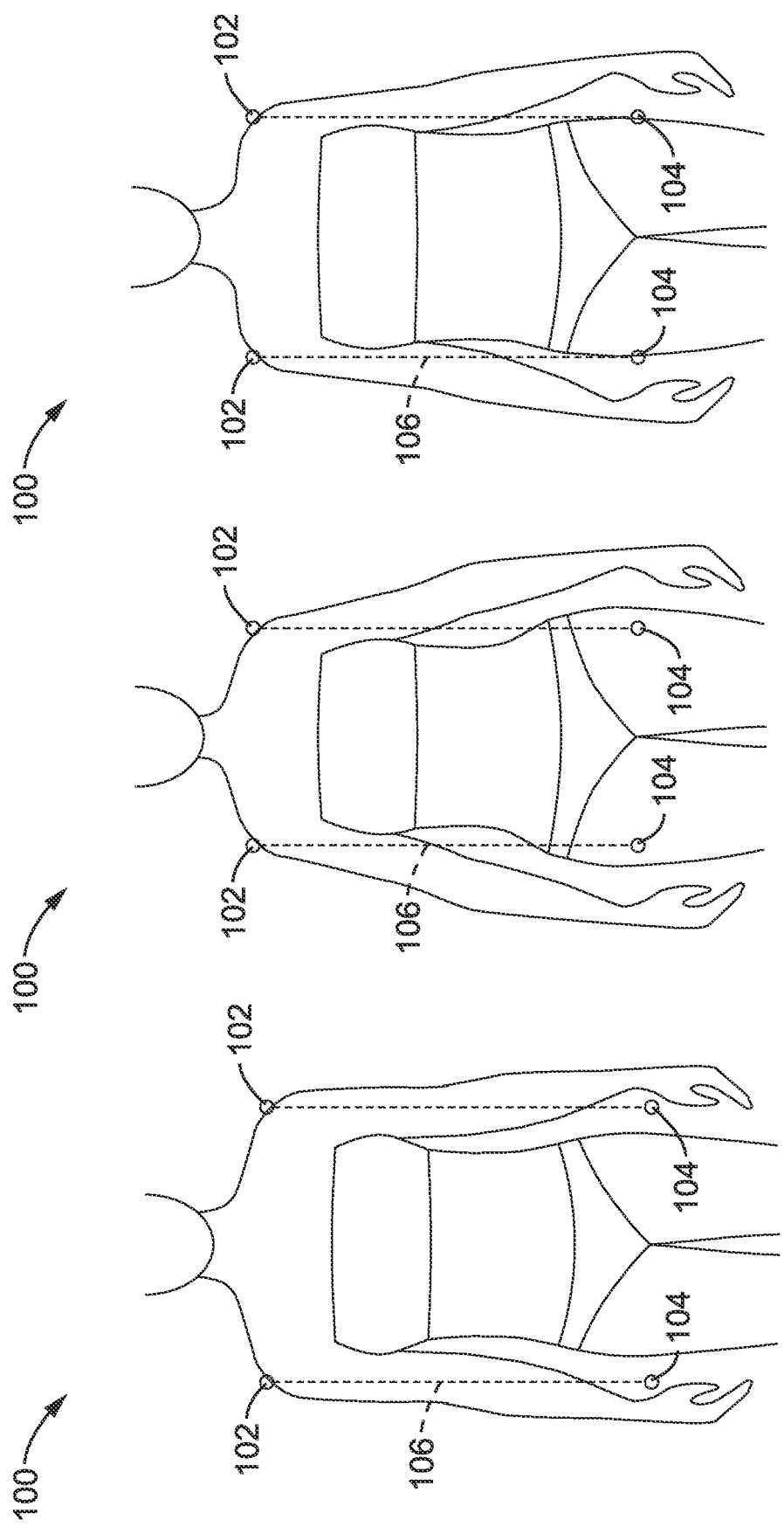

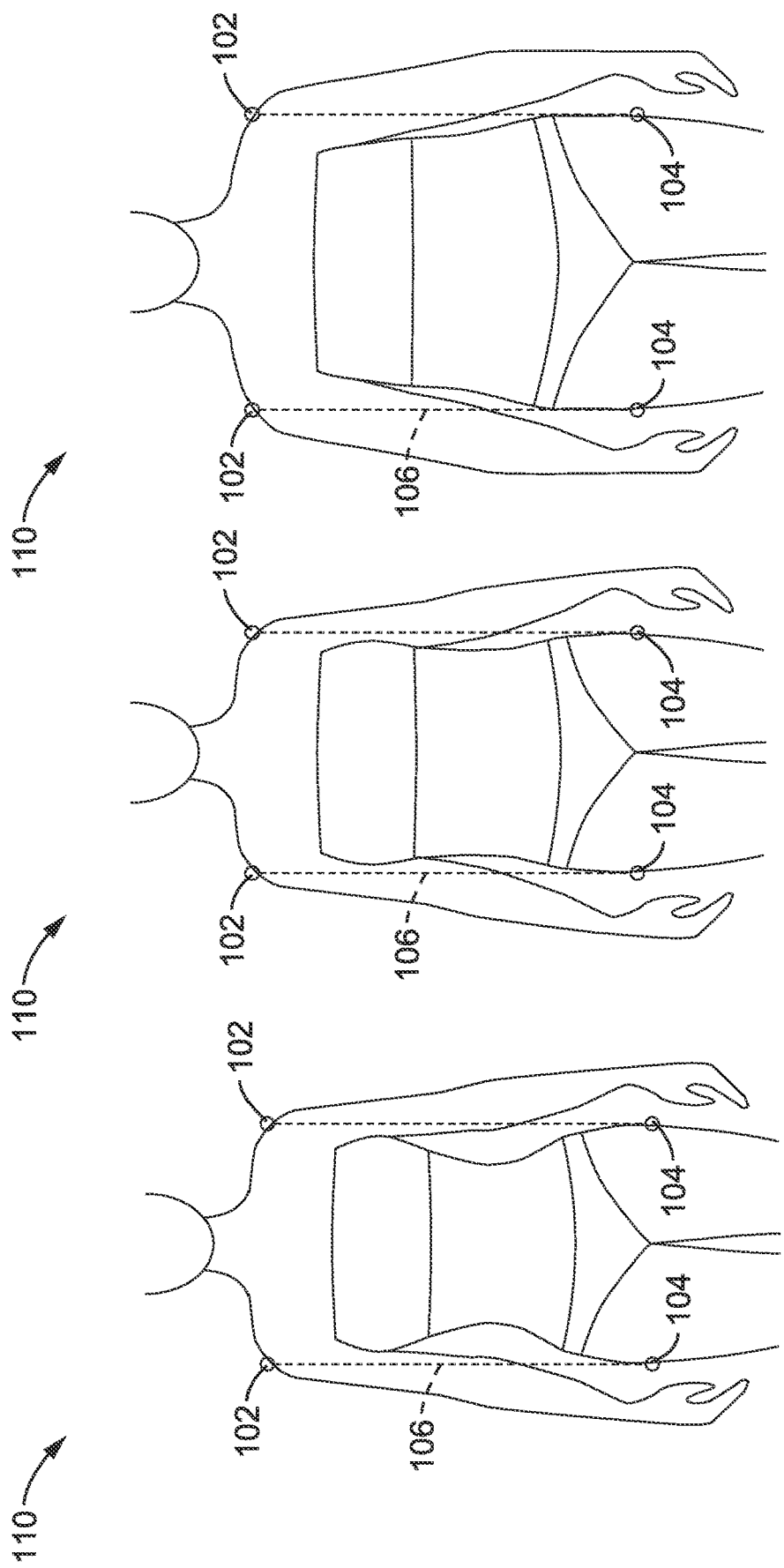

SYSTEMS AND METHODS FOR SHAPE CLASSIFICATION OF THE HUMAN FIGURE FOR APPAREL RECOMMENDATIONS

CROSS-REFERENCE TO RELATED APPLICATIONS

This application claims priority to, and the benefit of, U.S. provisional patent application Ser. No. 63/134,292 filed on Jan. 6, 2021, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Appendix A referenced herein is a computer program listing in a text file entitled "REV6612-01US-computer-program-appendix-A.txt" created on Dec. 31, 2021, and having a 81 kb file size. The computer program code, which exceeds 300 lines, is submitted as a computer program listing appendix through EFS-Web and is incorporated herein by reference in its entirety.

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to human figure shape classifications and clothing fit prediction schemes, and more particularly to a system and method for providing apparel attribute recommendations with a body shape selection process that uses a vertical visual frame and comparative reference to identify a body shape accurately with a geometric guideline as an overlay.

2. Background Discussion

The purchase of an article of clothing typically involves travel to a retail establishment, the examination of racks of clothing, trying on a selected article and then evaluating the fit. This decision is limited by the available inventory of the retail store and the access of the purchaser to the building.

The popularity of online shopping has significantly increased due to the ability to shop after normal store hours, compare merchandise from several different stores in a short time frame or view the available inventory of a store in a distant part of the country. Merchandise is usually displayed online with a photograph of a model wearing the garment, written description and a list of available sizes and prices. An item that is selected and subsequently purchased online is thereafter shipped to the purchaser.

One disadvantage of online shopping is the inability of the potential purchaser to examine and try on an appealing garment. The purchaser can only speculate as to the appearance of the garment on their particular body shape. Currently, the factor indicating a successful fit is determined by standard measurements in inches, or centimeters. If the measurements of an item of clothing match the measurements of a female figure, then proper fit is assumed. However, size is not by itself a reliable predictive measure.

Consequently, return rates among apparel, specifically women's apparel, are consistently high. If the only measure of a satisfactory fit was garment size, customers would be satisfied with any product that fit their measurements and would not return them thereafter.

Other fit methods rely solely on a comparison of sizing chart data versus the measurements of a female figure to determine an accurate fit. However, fit based on size measurements alone ignore the visual effect that garment attributes have on the female figure. A garment size may be accurate for a person, but its attributes could highlight an aspect of their anatomy that creates an undesirable effect, for example, an asymmetrical hem that emphasizes the hips. Satisfactory fit for clothing is based on size and the effect on shape, and current solutions rely only on size.

Current body shape categorization methods often result in inaccurate outcomes which deteriorate the predictive quality of the body shape information. Unfortunately, these methods are prone to human error and mis-categorization. Human body types are often miscategorized into shape cohorts. When body shape is used as a predictor for example, predicting the successful fit of an article of clothing, this mis-categorization disrupts the accuracy of the prediction. Other methods rely on subjective categorization by comparing one body type against other body types in a side-by-side manner.

In addition, retailers have a limited number of predictive indicators of inventory success with various types of apparel or of individual items. Planning of the assortment of apparel inventory offered by retailers typically relies on historical trends. The application of predictive success to apparel as a part of inventory optimization relies on year-over-year sales numbers and seasonal trends. Existing methods do not consider cohorts of shoppers with a predictive measure of successful fit. This may have significant profit margin implications due to the need to markdown products that do not find a satisfactory fit with shoppers.

Accordingly, there is a need for garment fitting and visualization technology that allows for body shape to be objectively categorized and that provides complimentary apparel recommendations.

BRIEF SUMMARY

Many potential purchasers of apparel from online collections are sensitive to the look that may be projected by articles of clothing on their individual body shape in their purchasing decisions. This may not be apparent from a photograph of a model wearing the specific article of clothing or a photograph of the clothing alone.

The present technology provides a system and method for potential purchasers to determine whether an item of clothing will actually look good (i.e. have a desirable or complimentary effect), when worn by the female figure. For inventory planning, the method introduces a statistical likelihood of a shorter average shelf life by determining coverage of complimentary apparel products by shape for any given population of shoppers segmented by shape.

The technology can be used to recommend women's apparel, to sort selections of clothing by degree of fit success, to optimize inventory of products for shopper segmentation, to predict the types of inventories desired by a target market, to lower the friction to purchase, to increase online conversion rates and to decrease returns.

The methods identify the attributes of clothing (beyond size) that achieve a desirable emphasis or de-emphasis in order to create balance on a female figure shape. This balance effect results in a successful fit when the female is dressed. For inventory optimization, predictive measures based on cohorts of female figure shapes allows for budget planning prior to the actual inventory purchase or manufacturing.

The methods assign attributes to a female figure's shape and identifies the aspects of apparel that create a desired (or complimentary) effect on those attributes. This effect results in higher satisfaction when purchased by the right shopper improving both return rates and better margins through inventory optimization.

The present apparatus and methods create an objective way to identify a body shape accurately with a geometric guideline as an overlay. The method provides guidance (relative comparison) in the selection process using a vertical visual frame of comparative reference.

The body shape categorization is made by placing a geometric indicator over body shape categories. Or by placing a geometric indicator overlay in an image captured by an imaging device such as a digital camera and software. The indicator preferably has four obvious corners or touch points and identifies the relative vertical alignment between key aspects of the human shape. The vertical visual frame is applied to achieve an accurate categorization of body shape.

The overlay creates a defined boundary which provides the reference for determining body shape. Using the overlay (visual frame of reference) identifies vertical alignment or a lack of vertical alignment. For example, a pear-shaped female's hips will fall outside the vertical frame. In contrast an hourglass shaped female figure will have equal touch points of the shoulders and hips along the vertical frame and her waist will be well inside the frame.

By using the vertical visual frame, an alignment of shape attributes of the human figure can be objectively defined thereby producing a proper categorization of shape. The shape is then a successful predictor of other factors. For example, apparel fit, exercise routines, medical forecasts, ideal healthy grocery list all by shape category.

In another embodiment, the body shape classification is performed by selection of body shape models with a visual frame overlay from a table of models. The model body shapes may also be delineated based on an additional variable attribute with a size range divided into three parts such as small, medium and large. Such variable body shape attributes include waist definition, bust size and upper arm size etc.

In one embodiment, the body shape classifications and apparel classifications are used to create an apparel scoring system. The scoring system may be added to the website of the retailer to allow a shopper to view photographs of the catalog of apparel offered by a merchant with each article presenting a specific score based on the shape attributes of the shopper. For example, a photograph of an article may include a written description, sizes, prices and a word score such as "perfect," "good" "satisfactory" and "not recommended."

According to one aspect of the technology, a system and method are provided that allows for body shape to be objectively categorized using a vertical visual frame of comparative references, a collection of articles of apparel that are classified and scored for body shape attributes and specific clothing style, color, design, cut and fit recommendations.

Another aspect of the technology it to provide a system and methods for providing a multi-variate body classifications and clothing characterizations that emphasize or de-emphasize various body features.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 5A is a reference diagram for user selected body type classification with a vertical visual reference of shoulder-hip alignment showing a "broad" classification.

FIG. 5B is a reference diagram for user selected body type classification with a vertical visual reference of shoulder-hip alignment showing a "narrow" classification.

FIG. 5C is a reference diagram for user selected body type classification with a vertical visual reference of shoulder-hip alignment showing a "in-line" classification.

FIG. 6A is a reference diagram for user selected body type classification with a vertical visual reference of shoulder-hip alignment showing an "in-line" classification and a "well defined" waist definition classification.

FIG. 6B is a reference diagram for user selected body type classification with a vertical visual reference of shoulder-hip alignment showing a "in-line" classification and a "not-well defined" waist definition classification.

FIG. 6C is a reference diagram for user selected body type classification with a vertical visual reference of shoulder-hip alignment showing a "in-line" classification and a "slightly defined" waist definition classification.

DETAILED DESCRIPTION

Referring more specifically to the drawings, for illustrative purposes, systems, devices and methods for apparel classifications and recommendations based on individualized objective shape categorizations for predictive online retail shopping and merchant inventory optimization are generally shown. Several embodiments of the technology are described generally in FIG. 1 to FIG. 6C to illustrate the characteristics and functionality of the devices, systems and methods. It will be appreciated that the methods may vary as to the specific steps and sequence and the systems and apparatus may vary as to structural details without departing from the basic concepts as disclosed herein. The method steps are merely exemplary of the order that these steps may occur. The steps may occur in any order that is desired, such that it still performs the goals of the claimed technology.

Figure 1:
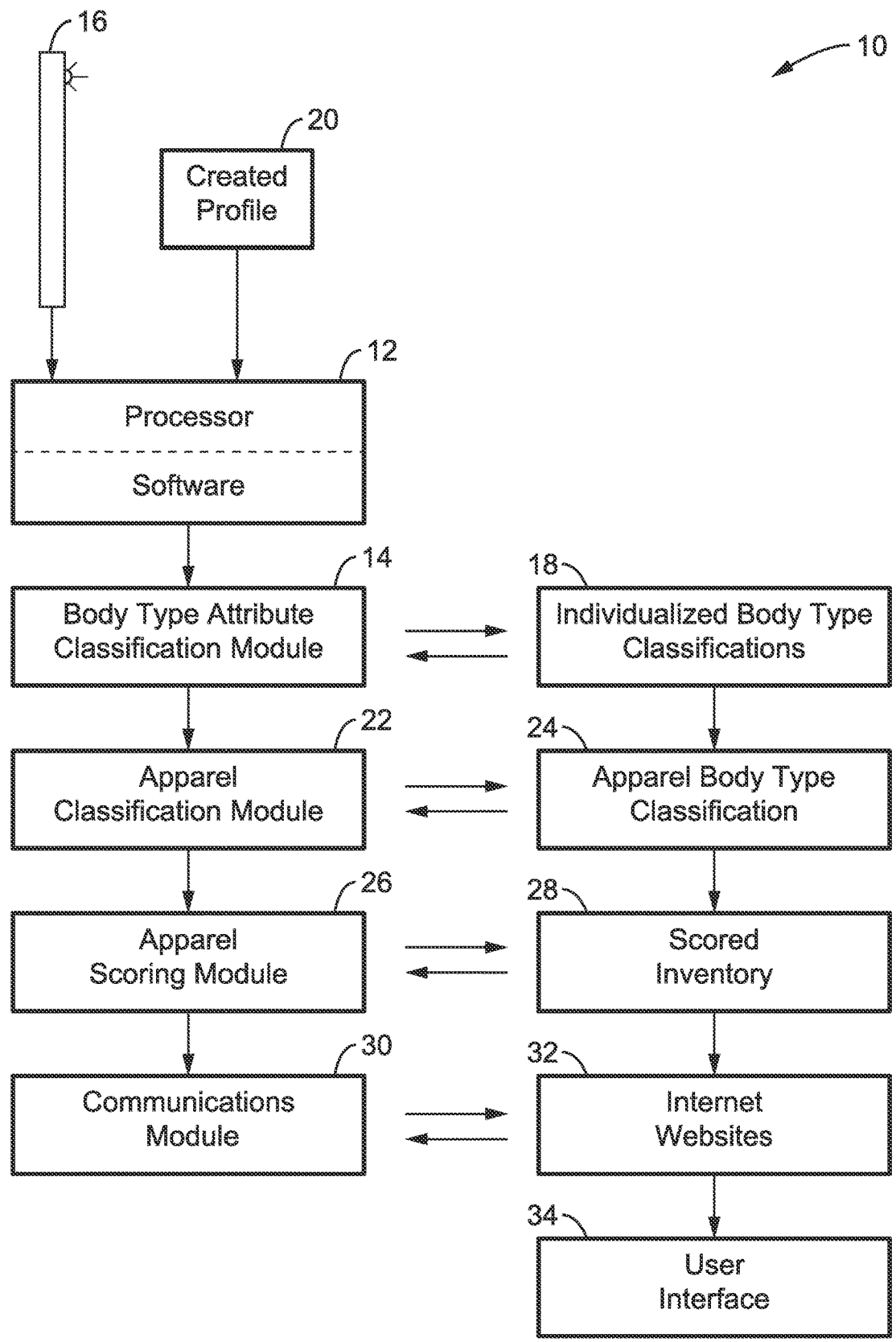
FIG. 1 is schematic system diagram of a system for objectively determining human body shape attributes and suitable apparel classification according to one embodiment of the technology.

Turning now to FIG. 1, an embodiment of the system 10 for objectively determining the shape category of a human figure and defining satisfactory fit and inventory optimization based on shape for women's apparel is shown schematically. The system 10 is centered on a computing device 12 that has a processor and software, with communications hardware, user interface and display capabilities to accomplish the classification, recommendation and display functions.

The computing device 12 can be a conventional device such as a cellular telephone, tablet, laptop computer, desktop computer, kiosk computer or software held on a server with online access. The computing device 12 is configured to generally receive data inputs and to produce outputs to a display. In one embodiment, the system outputs are sent over the internet to a website to provide a modified website display or establish user body attribute profile.

The software functions of the computing device 12 are generally provided by four modules in this embodiment. The first module is the body type attribute classification module 14 that produces individualized body type classifications 18 for a specific user. As use herein, a "body attribute" can be any part or section of the human anatomy that is visible and conventionally covered by an article of clothing. The term can also include the entire body shape or type classifications as well as body sections such as the waist, hips, bust, neck, legs and arms etc.

Figure 4:
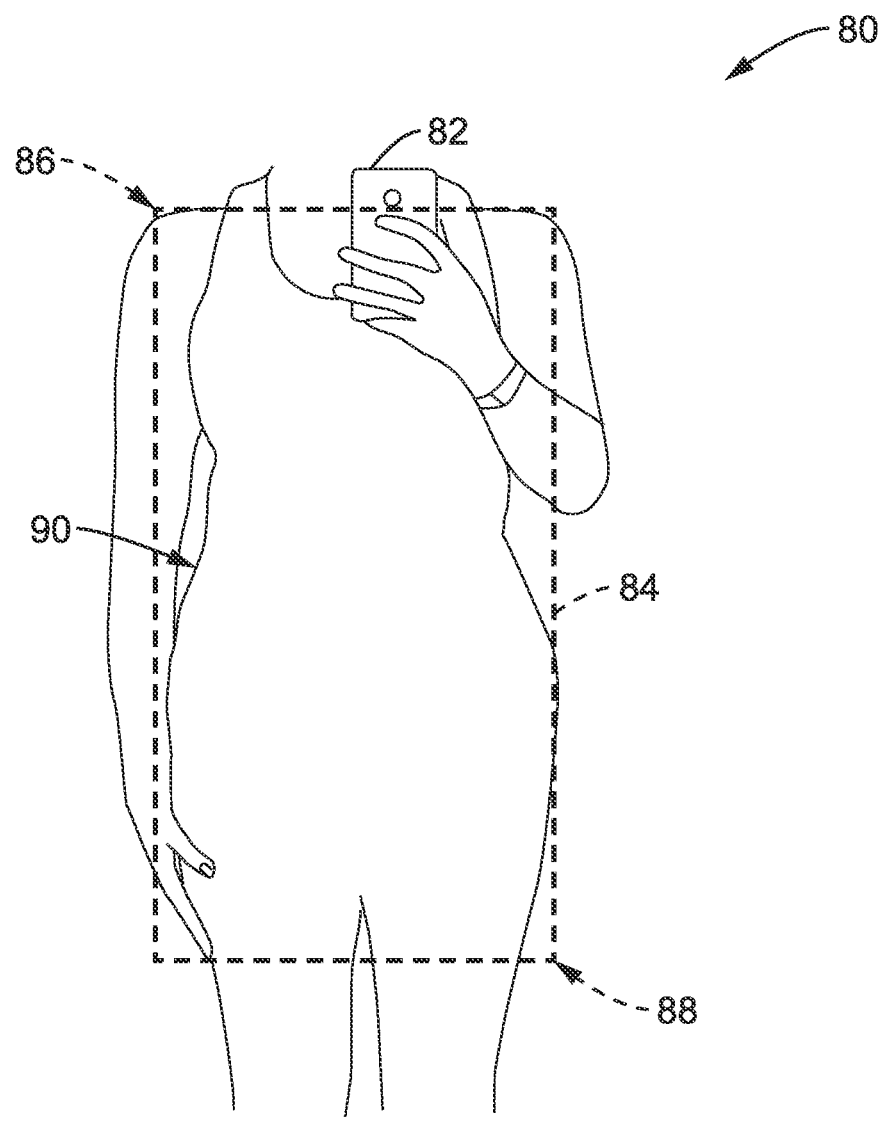
FIG. 4 depicts a body photograph with a vertical visual frame overlay for comparative reference.

The body type attribution module 14 provides an objective categorization of body type using a vertical visual frame of comparative reference. The module 14 preferably uses a geometric guideline as an overlay to identify a body shape accurately as illustrated in FIG. 4, FIG. 5 and FIG. 6.

Inputs for the module 14 for the body type classification may come from a digital imaging camera 16 in a cellular telephone or single purpose camera. A vertical visual frame is placed over the digital image of the body for evaluation and classification. In another embodiment, a geometric indicator overlay is generated in an image capturing device (e.g. a digital camera) at the time of image acquisition. For example, a rectangle appears in the view finder of the camera 16 that can be oriented over the body of the subject and the photograph is acquired. The image of the body can be acquired directly, or as a reflection in a mirror as shown in FIG. 4. The composite of the image and geometric indicator overlay is sent to the computing device 12 for further processing by the body type attribute classification module 14.

The body type classification at block 14 may also be made by placing a geometric indicator over body shape categories and the relevant attributes are then selected by the user. The individual body type classification 18 is based on the same attributes as the used with the classification based on a photograph. However, selections are made from a table of diagrams rather than from photographs.

The body type classification module 14 can also analyze and incorporate one or more additional body attributes with size ranges or characteristics divided into ranges such as small, medium and large, for example. These additional body attributes provide a multi-variate individualized body type classifications at block 18 and corresponding apparel aspect classifications by the apparel classification module 22.

A profile 20 can also be created and used as inputs to the computing device 12. In addition to the body type attribute classification 18, the profile 20 can include other attributes such as hair color, skin color, eye color, height, style preferences and other personal information.

The apparel classification module 22 produces an apparel body type classification at block 24. The apparel classifications of individual articles of clothing are based on body type attributes as well as fashion color and pattern rules, sizes and other predictive measures of successful fit. The classification module 22, for example, identifies the attributes of clothing (beyond size) that achieve a desirable emphasis in order to create balance on various female figure shapes and proportions. This balance effect results in a successful fit when the female is dressed and overall satisfaction with the selected apparel.

In one embodiment, the apparel classification module 22 extracts key phrases from the title, description and other textual details of a particular article of clothing. Such key phrases for classification may include, pattern, material composition, color, size, cut, purpose, title and other relevant descriptions. The key phrases may then be organized into their individual tokens and words, parts of speech, sentence structure, characteristics or rules to identify specific attributes of the classified item at block 24. In addition to, or instead of, natural language understanding of the textual elements of a garment, image recognition and understanding could also be used to identify attributes.

The Apparel scoring module 26 can correlate the attributes found with their generic versions of clothing and body type to determine what effect the attributes have on shape. The module 26 may also correlate suitable complementary or contrasting clothing colors with skin, eye and hair colors as well as types of patterns, clothing styles and functions. The module 26 may also correlate clothing style types, complementary and incompatible colors and patterns and fits with each of the identified body types.

These correlations and rules may be used to generate scoring rules that can be applied to generate body type dependent scores for a particular article of clothing within an inventory. These scoring rules can be applied to each item in an inventory to produce a scored inventory at block 28. Each article may have a different score for each of the different body types. For example, in one embodiment, each item in the inventory is scored based on combined attribute effects on a scale of 0-100 for each of the specific female shapes. In another embodiment, the derived scores are placed into groups associated with a recommendation of "excellent," "good," "satisfactory" or "not recommended" based on the body type dependent score. In another embodiment, the scoring recommendation is a "Yes" or "No" based on body type.

The assignment of effect that a generic attribute of clothing has on the female shape is necessary as well as the category of female shape to make the recommendation. Without both components a fit recommendation based on shape will not be accurate.

The communications module 30 of the system shown in FIG. 1 is used to facilitate the transfer of information or data between a server and a device or for online communications over the internet at block 32. In the case of a mobile device application, the communications module hardware may exist in the mobile device and communications can take place over a cellular telephone network, for example.

In one embodiment, the user reviews and selects an article of clothing from a website with a mobile device user interface 34 and the apparel classification 22 and scoring modules 26 prepare a score for the item that was selected. The recommendation is then displayed through the display screen and user interface 34 of the mobile device.

However, the communications module may be optional in embodiments where the system is self-contained and the clothing recommendation from an internal apparel database is displayed to a user. Such self-contained systems may be placed in kiosks within a retail shop, for example.

Figure 2:
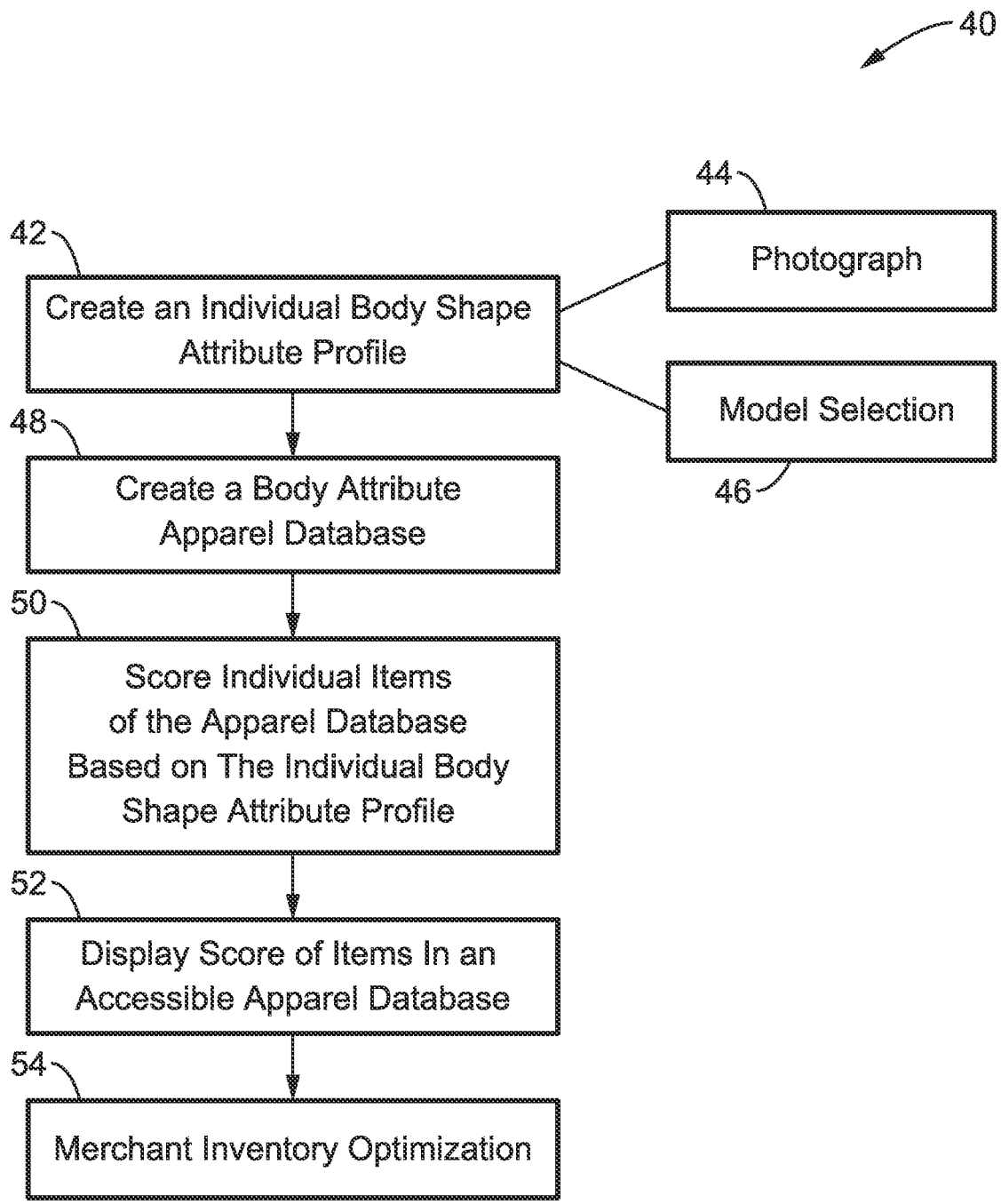
FIG. 2 is a block flow diagram of a method for creating a user body shape profile and scored apparel database according to one embodiment of the technology.

Turning now to FIG. 2, one embodiment of a method 40 for producing a body type dependent score of an article of clothing and collections of scored articles of clothing is shown schematically. In this embodiment, an individual body shape attribute profile is created for a specific user at block 42. The body shape of the user for the attribute profile can be determined by evaluation of a photograph of the user at block 44 or by a model selection at block 46. Body shape classifications using a digital photograph at block 44 are illustrated in the embodiments shown in FIG. 3 and FIG. 4. Body shape classifications based on the selection of model types are illustrated in FIG. 5 and FIG. 6.

Optionally, the body shape attribute profile created at block 42 may include additional information such as eye, skin and hair colors, height, and age as well as clothing type, material preferences and prior purchase history. These aspects may also be given some weight in the calculation of apparel scores.

A body attribute apparel database is created at block 48. The features of assorted styles, cuts, materials, patterns, and closures etc. that accentuate or diminish the identified body attributes are identified and catalogued. These features are used in the classification and selection of suitable apparel in the database that is created at block 48.

Each item of apparel in the database is preferably provided with a written description of features such as style, cut, sizes, materials used, material patterns, colors, the presence of zippers or other fasteners etc. The item description may also be characterized as having features or generic attributes that produce a desired positive or negative visual effect for a particular body type or shape. Photographs of the apparel on a particular body type or shape may also be present in the database.

In an alternative embodiment, the attribute apparel database is created at block 48 from existing catalogs or collections. The title, text descriptions, purchaser comments and photographs of each item of the collection are evaluated to identify features and generic attributes that can be characterized.

For example, key phrases from the apparel's title, description and other textual details can be extracted and organized into their individual tokens and words, parts of speech, sentence structure, to identify specific attributes of the item.

The extracted attributes are then correlated with their generic versions to determine what effect the attributes have on a body shape at block 48. Generic attributes of women's clothing are preferably categorized into the balancing effect they have on the female figure, for example. A balancing effect may be based on what parts of the female figure are emphasized or maintained by the attribute. For example, shoulder cut-outs on a sleeve emphasize the shoulder of the figure, while a vertical neckline on a shirt maintains the figure's shoulders and waist. A list of generic attributes with their emphasizing and/or maintaining features may also be created at block 48.

At block 50, the collection of attributes and features may be given a score based on the expected combined effects of the attributes on each body type in the embodiment shown in FIG. 2. The collection of features identified for a specific item of apparel at block 48 are preferably evaluated for the combined effect they have on the different body types of the female figure. This evaluation may use a numeric scale that quantifies the effect created by the attributes with respect to the effects desired by the particular female shape. For example, an identified vertical neckline that maintains the shoulders and waist, may score very highly towards the requirements of certain body shapes in the maintenance of the balance and alignment of the shoulders and hip cage and maintenance of the waistline.

The scores for each item in the collection will normally be different for each body type at block 50. The score is then used to provide a recommendation based on a body type or other body attribute that has been identified by the user. The higher the score obtained at block 50, the more desirable effect the garment produces for a particular female shape in this embodiment. This score can also be used to curate consumer facing e-commerce recommendations and identify merchandise gaps by shape cohorts.

Accordingly, the body attribute database takes a holistic view of the garment as there could be many features that each have their specific to generic effect. The holistic scoring combines the effects created into a numerical indicator of how strongly the garment exemplifies the effect.

The database of scored inventory of clothing can be displayed with each article having a scores and provide a recommendation based on the identified body type at block 52. Such a database can be accessed and searched online with an available recommendation for each article of clothing in the collection.

In one embodiment, a search of the database of scored inventory only displays clothing at block 52 that has a neutral or positive recommendation based on the identified body type of the user. This reduces the number of items presented to the user that are not recommended for the particular body attributes of the user.

In another embodiment, the score and recommendation produced for a specific article of clothing within the database is based on a broader individual body shape profile of the user created at block 42. It is also possible to search the database or provide recommendations based on the user preferences, characteristics and body shape designations in the body shape attribute profile of the user.

Finally, the scored apparel databases, classification and recommendation schemes and the history of body type purchases over time can permit merchants to recognize trends and optimize inventories at block 54. Merchants can identify over-allocation and under-representation of inventory to specific shape segments. New inventory offerings can be planned in view of specific apparel attributes contributing to fit success for specific body shapes.

In summary, the methods can be used to recommend women's apparel, to sort selections of clothing by degree of fit success, to optimize inventory of products for shopper segmentation, to predict the types of inventories desired by a target market, to lower the friction to purchase, to increase online conversion rates and to decrease returns.

Figure 3:
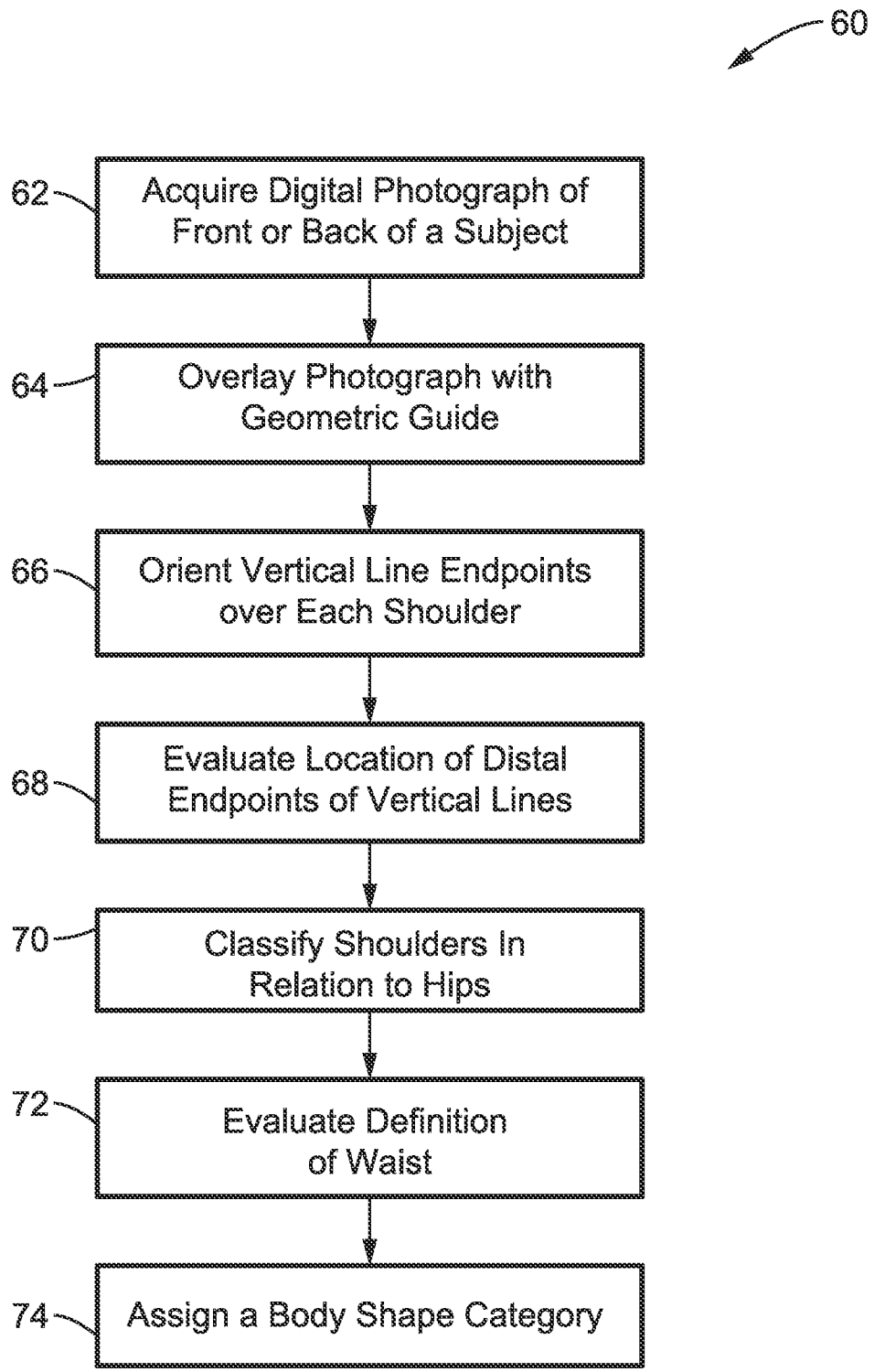
FIG. 3 is a block flow diagram of a method for objectively according to one embodiment of the technology.

Referring now to FIG. 3, one embodiment of a method 60 for categorizing a body shape from a digital photograph is illustrated. At block 62, a digital photograph of the front or the back of a subject is acquired. A geometric guide is placed over the top of the acquired digital photograph at block 64. The geometric guide is preferably a vertically oriented rectangle or parallel vertical lines with top and bottom endpoints.

The rectangular geometric guide embodiment has four corners or touch points, and the parallel line embodiment has endpoints connected with vertical lines. The endpoints or corners of the guide are oriented over each shoulder of the subject at block 66 and illustrated in FIG. 4. The geometric indicator has four obvious corners or touch points and identifies the relative vertical alignment between key aspects of the human shape. The vertical visual frame is applied at block 66 to achieve an accurate categorization of body shape.

Once the top corners of the rectangular frame or line endpoints are positioned over the shoulders of the subject, the location of the bottom corners of the frame or distal endpoints of the parallel lines are evaluated at block 68. The bottom two corners of the rectangle or distal endpoints of the lines are aligned with the lower hip cage at the top of the legs at block 68 properly orient the reference frame.

At block 70, the relation of the shoulders to the hips is classified according to one of three possible classifications. If the shoulders are broader than the hips, then a "broader" classification is assigned. In this case the hips will be contained within the rectangle or between the parallel vertical lines. If the shoulders are narrower than the hips, then a "narrower" classification is assigned. Here, the hips will be outside of the rectangle or parallel vertical lines. If the space between the shoulders and the space between the hips are approximately equal, then an "in-line" classification is assigned at block 70.

Accordingly, the overlay creates a defined boundary which provides the reference for determining body shape. The identifies vertical alignment or a lack of vertical alignment. For example, the hips of a pear-shaped female will fall outside of the vertical frame. In contrast, an hourglass shaped female figure will have equal touch points of the shoulders and hips along the vertical frame and her waist will be well inside of the frame.

The definition of the waist is then evaluated at block 72 and classified into three categories. The first category is where the waist is "well-defined," meaning a distinct narrowing is present between the rib cage and the top of the hips. The second category is where the waist is only "slightly defined." The third category is where the waist is "not well defined." In one embodiment, this categorization is optional.

In the embodiment shown in FIG. 3, there are nine possible body shape classifications that can be made at block 74 based on the vertical frame and waist evaluation classifications. Some of these variations are illustrated in FIG. 5 and FIG. 6. The possible two variable body shape classifications are as follows: Broader-well defined; Broader-slightly defined; Broader-not well defined; Narrower-well defined; Narrower-slightly defined; Narrower-not well defined; and Inline-well defined; Inline-slightly defined; Inline-not well defined.

While body shape classifications based on two variables are illustrated, it can be seen that the body shape definitions can be based on one or more aspect variables. For example, additional variable attributes such as bust size, hip size and arm size can be part of the classification to provide three or more variables. One or more of these additional variables are preferably divided into groupings where the range is grouped into "small," "medium" and "large" or segmented into "present" or "absent" characteristics. Such variables can be incorporated into the body attribute classifications generically as well as in the classifications of the subject.

In addition, the segmented secondary attributes can be the focus of clothing features that accentuate or diminish the identified body attributes in combination with the body shape classifications for suitable clothing selections. The identified body shape category or attributes of the user at block 74 are used to generate positive or negative recommendations for apparel or apparel combinations that have a complimentary effect on those body attributes or create a desirable visual impression. The tailored recommendations result in higher satisfaction when purchased by the informed shopper improving both return rates and better margins through inventory optimization.

Body shape categorization 80 using a photograph and a mobile device and software application is illustrated in FIG. 4. In this illustration, the user is standing in front of a full-length mirror and the mobile device 82 acquires an image. This allows the user to take a photograph of themselves in this embodiment. However, the mobile device 82 could be operated by a second person to acquire the digital photograph of the front or back of the torso of the subject.

A geometric indicator 84 in the form of a rectangle is sized and oriented lengthwise over the body represented in the photographic image. One corner 86 of the rectangular indicator is placed over one shoulder and a second corner of the indicator 84 is placed over the other shoulder. The bottom two corners 88 of the geometric indicator 84 are preferably below the lower hip cage at the upper part of the legs of the torso.

In one embodiment, the mobile device application software allows the placement of the geometric indicator 84 overlay over the view finder image before the final digital image is acquired by the camera. This provides a digital photograph with a properly oriented geometric indicator for analysis by the software and by the user.

Once the geometric indicator 84 is properly oriented, the parts of the body that are inside and outside of the rectangular indicator are observed. In particular, if the hips are outside of the indicator 84, then a classification of "broader" is assigned. If the hips are inside of the rectangle, then a classification of "narrower" is made. In the illustration shown in FIG. 4, the hips and shoulders are aligned and classification of "in-line" would be assigned.

Finally, the waist attribute 90 can be classified by observing the definition of the waist in relation to the rest of the body. The waist of the user is preferably classified as being "well defined," "slightly defined" or "not-well defined." In other embodiments, secondary body attributes can be classified from both the photograph and an attribute selection template.

Alternatively, the body type classification can be user self-selected from shape illustrations such as those shown in FIG. 5A to FIG. 5C and FIG. 6A to FIG. 6C. The selected shape illustration is then used by the methods to provide clothing recommendations to the user.

The selection process of a body type in this embodiment is made from an illustrated group of body types such as those shown in FIG. 5A to FIG. 5C. For this selection, the user visualizes the placement of the two vertical lines 106 with touch points at both ends of the line. The top touch points 102 are positioned at the shoulders and the bottom touch points 104 are placed in the area of the hip cage. The vertical alignment of the shoulders to the hips is evaluated by determining where the location of the edge of the hips with the vertical line 106 extending between the top 102 and bottom 104 touch points. For example, in FIG. 5A the shoulders are wider than the hips and the hips are contained between the vertical lines 106. Selection of the diagram of FIG. 5A would provide a "narrower" body type classification.

In FIG. 5B the hips are broader than the shoulder points 102 and are outside of the vertical lines 106. Selection of the diagram shown in FIG. 5B by the user would lead to a "broader" body type classification. The diagram shown in FIG. 5C illustrates the shoulders being aligned with the hips. Selection by the user of this diagram would lead to an "in-line" classification.

In another embodiment, the user can select from diagrams with additional body features or aspects such as waist definition. For example, the user will view the possible diagrams and select a diagram that has the same hip to shoulder alignment using the geometric indicator as well and the waist definition that describes their body shape.

As shown in FIG. 6A, selection 110 of the classification diagram will include both the selection of waist definition and hip alignment in no particular order. In FIG. 6A, the diagram shows an "in-line" body type based on the vertical alignment touch points and a "well-defined" waist. An "in-line" body type and "slightly defined" waist is illustrated in the diagram of FIG. 6B. In the example of FIG. 6C, the diagram shows an "in-line" body type with a "not well defined" waist.

The diagrams with the body shape and waist definition features that have three variations will produce a selection panel of nine possibilities. However, other feature selections can be added to the diagram or to survey listing the features. For example, panel of diagrams with a third feature such as breast size (small, medium, or large) can be created. This will give a panel of 27 diagrams with variable features for selection. Other variable body shape features such as upper arm size, thigh sizes and bottom sizes can be incorporated into panels in addition to or in place of the waist definition feature. Preferably, if additional variable body attribute has a size range, the size range is divided into three parts of small, medium and large for selection.

An example of computer program instructions for implementing the systems and methods described in this disclosure is provided in Appendix A which forms a part of this disclosure. Example datasets for the computer program instructions are provided in Table 1 and Table 2 of this disclosure.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general-purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure(s) algorithm(s), step(s), operation(s), formula (e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

A system for body shape classification, the system comprising: (a) a digital camera; (b) a computing device with a processor configured to receive input from the digital camera; and (c) a non-transitory memory storing instructions executable by the processor; (d) wherein the instructions, when executed by the processor, perform steps comprising: (i) acquiring a digital photograph of a torso of a subject from the digital camera; (ii) overlaying a geometric guide over the torso, the geometric guide positioned with a first endpoint positioned at a first shoulder of the torso of the subject with a first edge extending vertically from the first endpoint and a second endpoint positioned at a second shoulder of the torso with a second edge extending vertically from the second endpoint, the second edge parallel to the first edge; (iii) determining a location of outer hip surfaces of the torso in relation to the vertical edges of the geometric guide; and (iv) assigning a body shape classification based on the location of the outer hip surfaces in relation to the vertical edges of the geometric guide.

The system of any preceding or following implementation, wherein the geometric guide is overlayed over the posterior side of the torso of the subject.

The system of any preceding or following implementation, wherein the geometric guide is in the shape of a rectangle with two corners oriented over the shoulders of the torso of the subject.

The system of any preceding or following implementation, wherein the geometric guide is in the shape of parallel vertical lines with a controllable distance between lines.

The system of any preceding or following implementation, the computing device further comprising: a display configured to display the digital photograph with the geometric guide overlay and the body type classification.

The system of any preceding or following implementation, the computing device further comprising: a communications node capable of sending and receiving data over a communications network.

The system of any preceding or following implementation, wherein the instructions when executed by the processor further perform steps comprising: analyzing waist definition of the torso of the subject; and assigning a body shape classification based on the location of the outer hip surfaces in relation to the vertical edges of the geometric guide and the definition of the waist of the torso of the subject.

The system of any preceding or following implementation, wherein the instructions when executed by the processor further perform steps comprising: characterizing a bust size of the torso of the subject; analyzing waist definition of the torso of the subject; and assigning a body shape classification based on the location of the outer hip surfaces in relation to the vertical edges of the geometric guide, the characterized bust size and the definition of the waist of the torso of the subject.

The system of any preceding or following implementation, wherein the instructions when executed by the processor further perform steps comprising: accessing a database of apparel with individual items of apparel scored based on body shape classifications; and recommending one or more items of apparel based on the assigned body shape classification of the subject and the score of the item for that body shape classification.

The system of any preceding or following implementation, wherein the instructions when executed by the processor further perform steps comprising: communicating with at least one external internet website that has an inventory of articles of apparel; scoring one or more articles of the inventory based on the assigned body shape classification of the subject; and displaying the score of the one or more articles on a display.

A method for providing apparel recommendations, the method comprising: (a) assigning a body shape profile to a subject; (b) providing a database of items of apparel, each item scored with a score for one or more defined body shape; (c) recommending an item of apparel to the subject based on the assigned body shape profile of the subject and the score of the item of apparel for the assigned body shape.

The method of any preceding or following implementation, the assigning a body shape profile to a subject further comprising: providing a group of model body shapes defined by vertical guidelines projecting from at least one shoulder of each body shape of the group; and selecting a model body shape from the group of body shapes that accurately represents the body shape of the subject.

The method of any preceding or following implementation, the model body shapes further comprising at least one additional variable attribute with a size range divided into three parts of small, medium and large, the variable selected from the group consisting of waist definition, bust size and upper arm size.

The method of any preceding or following implementation, the assigning a body shape profile to a subject further comprising: acquiring a digital photograph of a torso of a subject from a digital camera; overlaying a geometric guide over the photograph of the torso, the geometric guide positioned with a first endpoint positioned at a first shoulder of the torso of the subject with a first edge extending vertically from the first endpoint and a second endpoint positioned at a second shoulder of the torso with a second edge extending vertically from the second endpoint, the second edge parallel to the first edge; determining a location of outer hip surfaces of the torso in relation to the vertical edges of the geometric guide; and assigning a body shape classification based on the location of the outer hip surfaces in relation to the vertical edges of the geometric guide.

The method of any preceding or following implementation, the body shape classification further comprising: analyzing waist definition of the torso of the subject; and assigning a body shape classification based on the location of the outer hip surfaces in relation to the vertical edges of the geometric guide and the definition of the waist of the torso of the subject.

A method for providing apparel recommendations, the method comprising: (a) identifying human body type attributes; (b) identifying features of apparel that accentuate or diminish identified body attributes; (c) assessing body type attributes of a subject; and (d) recommending items of apparel to the subject based on the assessed body type attributes of the subject and the identified features of apparel for the identified body type attributes.

The method of any preceding or following implementation, further comprising: creating a database of apparel with the identified features of apparel that accentuate or diminish identified body attributes; and recommending items of apparel to the subject from the database.

The method of any preceding or following implementation, the body type attribute assessment of the subject further comprising: providing a group of model body shapes defined by vertical guidelines projecting from at least one shoulder of each body shape of the group; and selecting a model body shape from the group of body shapes that accurately represents the body attributes of the subject.

The method of any preceding or following implementation, the body type attribute assessment of the subject further comprising: acquiring a digital photograph of a torso of the subject from a digital camera; overlaying a geometric guide over the photograph of the torso, the geometric guide positioned with a first endpoint positioned at a first shoulder of the torso of the subject with a first edge extending vertically from the first endpoint and a second endpoint positioned at a second shoulder of the torso with a second edge extending vertically from the second endpoint, the second edge parallel to the first edge; determining a location of outer hip surfaces of the torso in relation to the vertical edges of the geometric guide; and assessing a body shape attribute based on the location of the outer hip surfaces in relation to the vertical edges of the geometric guide.

The method of any preceding or following implementation, the body type attribute assessment of the subject further comprising: assessing at least one additional variable body attribute with a size range divided into three parts of small, medium and large, the variable selected from the group consisting of waist definition, bust size and upper arm size.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, upper and lower, left and right, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1 dresses_v1

| Rule | Tops_Primary | Tops_Secondary | Dress | Skirt | SD1 | SD1_3 | SD2 | SD2_3 | SD3 | SD3_P |
|---|---|---|---|---|---|---|---|---|---|---|
| Tops_V | maintains shoulders, waist | | | | 100 | 100 | 25 | 25 | 100 | 100 |
| Tops_H | creates shoulders | | | | 25 | 25 | 100 | 100 | 75 | 75 |
| Tops_N | maintains shoulders | | | | 75 | 75 | 75 | 75 | 75 | |
| Tops_V_Skirts_H | maintains shoulders, waist | | | creates hips | 100 | 75 | 25 | 25 | 75 | 75 |
| Tops_H_Skirts_H | creates shoulders | | | creates hips | 50 | 25 | 25 | 25 | 75 | 75 |
| Tops_N_Skirts_H | maintains shoulders | | | creates hips | 100 | 75 | 25 | 25 | 75 | 75 |
| Tops_V_Skirts_H_V | maintains shoulders, waist | | | creates_with_volume hips | 50 | 75 | 25 | 25 | 100 | 100 |
| Tops_H_Skirts_H_V | creates shoulders | | | creates_with_volume hips | 25 | 25 | 25 | 25 | 75 | 75 |
| Tops_N_Skirts_H_L_V | maintains shoulders | | | creates_with_volume hips | 25 | 25 | 25 | 25 | 100 | 100 |
| Tops_V_Skirts_M_L_V | maintains shoulders, waist | | | maintains_with_low_volume hips | 100 | 75 | 50 | 50 | 75 | 75 |
| Tops_H_Skirts_M_L_V | creates shoulders | | | maintains_with_low_volume hips | 25 | 25 | 100 | 100 | 75 | 75 |
| Tops_N_Skirts_M_L_V | maintains shoulders | | | maintains_with_low_volume hips | 75 | 75 | 75 | 75 | 75 | 75 |
| Tops_V_Skirts_M_H_V | maintains shoulders, waist | | | maintains_with_high_volume hips | 50 | 50 | 75 | 75 | 100 | 100 |
| Tops_H_Skirts_M_H_V | creates shoulders | | | maintains_with_high_volume hips | 25 | 25 | 100 | 100 | 100 | 100 |
| Tops_N_Skirts_M_H_V | maintains shoulders | | | maintains_with_high_volume hips | 25 | 25 | 100 | 100 | 100 | 100 |
| Tops_V_Dress_M_L_V_Skirts_V | maintains shoulders, waist | | maintains_with_low_volume hips | creates_with_volume hips | 50 | 75 | 25 | 25 | 100 | 100 |
| Tops_H_Dress_M_L_V_Skirts_V | creates shoulders | | maintains_with_low_volume hips | creates_with_volume hips | 25 | 25 | 25 | 25 | 100 | 100 |

TABLE 1-continued

| | | | | | | | | | |
|---|---|---|---|---|---|---|---|---|---|
| Tops_N_Dress_M_LV_Skirts_V | maintains shoulders | | maintains_with_low_volume hips | creates_with_volume hips | 75 | 75 | 25 | 25 | 100 | 100 |

TABLE 2 tops_v1

| Rule | Tops_Primary | Tops_Secondary | SD1 | SD1_3 | SD2 | SD2_3 | SD3 | SD3_P |
|---|---|---|---|---|---|---|---|---|
| Tops_V | maintains shoulders, waist | | 100 | 75 | 25 | 25 | 50 | |
| Tops_H | creates shoulders | | 25 | 25 | 100 | 75 | 25 | |
| Tops_N | maintains shoulders | | 75 | 50 | 75 | 50 | 75 | |
| Tops_V_Shoulders | maintains shoulders, waist | creates shoulders | 50 | 75 | 50 | 50 | 75 | |
| Tops_H_Shoulders | creates shoulders | creates shoulders | 25 | 25 | 100 | 75 | 50 | |
| Tops_N_Shoulders | maintains shoulders | creates shoulders | 50 | 50 | 100 | 100 | 50 | |
| Tops_V_Hips | maintains shoulders, waist | creates hips | 75 | 75 | 25 | 25 | 75 | |
| Tops_H_Hips | creates shoulders | creates hips | 50 | 50 | 25 | 25 | 75 | |
| Tops_N_Hips | maintains shoulders | creates hips | 75 | 50 | 25 | 25 | 50 | |
| Tops_V_Waist | maintains shoulders, waist | creates waist | 75 | 100 | 25 | 25 | 100 | |
| Tops_H_Waist | creates shoulders | creates waist | 50 | 50 | 100 | 100 | 100 | |
| Tops_N_Waist | maintains shoulders | creates waist | 75 | 100 | 75 | 100 | 100 | |
| Tops_V_Waist_Hips | maintains shoulders, waist | creates waist, hips | 75 | 100 | 25 | 25 | 100 | |
| Tops_H_Waist_Hips | creates shoulders | creates waist, hips | 50 | 50 | 25 | 25 | 100 | |
| Tops_N_Waist_Hips | maintains shoulders | creates waist, hips | 75 | 75 | 25 | 25 | 100 | |
| Tops_H_Waist_Illusion | creates shoulders | Illusion of waist | 25 | 25 | 100 | 75 | 75 | |

What is claimed is:

1. A system for body shape classification, the system comprising:
   (a) a digital camera;
   (b) a computing device with a processor configured to receive input from the digital camera; and
   (c) a non-transitory memory storing instructions executable by the processor;
   (d) wherein said instructions, when executed by the processor, perform steps comprising:
      (i) acquiring a digital photograph of a torso of a subject from the digital camera;
      (ii) overlaying a geometric guide over the torso, said geometric guide positioned with a first endpoint positioned at a first shoulder of the torso of the subject with a first edge extending vertically from the first endpoint and a second endpoint positioned at a second shoulder of the torso with a second edge extending vertically from the second endpoint, said second edge parallel to the first edge;
      (iii) determining a location of outer hip surfaces of the torso in relation to the vertical edges of the geometric guide; and
      (iv) assigning a body shape classification based on the location of the outer hip surfaces in relation to the vertical edges of the geometric guide.

2. The system of claim 1, wherein the geometric guide is overlayed over the posterior side of the torso of the subject.

3. The system of claim 1, wherein the geometric guide is in the shape of a rectangle with two corners oriented over the shoulders of the torso of the subject.

4. The system of claim 1, wherein the geometric guide is in the shape of parallel vertical lines with a controllable distance between lines.

5. The system of claim 1, said computing device further comprising:
   a display configured to display the digital photograph with the geometric guide overlay and the body type classification.

6. The system of claim 1, said computing device further comprising:
   a communications node capable of sending and receiving data over a communications network.

7. The system of claim 1, wherein said instructions when executed by the processor further perform steps comprising:
   analyzing waist definition of the torso of the subject; and
   assigning a body shape classification based on the location of the outer hip surfaces in relation to the vertical edges of the geometric guide and the definition of the waist of the torso of the subject.

8. The system of claim 1, wherein said instructions when executed by the processor further perform steps comprising:
   characterizing a bust size of the torso of the subject;
   analyzing waist definition of the torso of the subject; and
   assigning a body shape classification based on the location of the outer hip surfaces in relation to the vertical edges of the geometric guide, the characterized bust size and the definition of the waist of the torso of the subject.

9. The system of claim 1, wherein said instructions when executed by the processor further perform steps comprising:
   accessing a database of apparel with individual items of apparel scored based on body shape classifications; and
   recommending one or more items of apparel based on the assigned body shape classification of the subject and the score of the item for that body shape classification.

10. The system of claim 6, wherein said instructions when executed by the processor further perform steps comprising:
   communicating with at least one external internet website that has an inventory of articles of apparel;
   scoring one or more articles of the inventory based on the assigned body shape classification of the subject; and
   displaying the score of the one or more articles on a display.

11. A method for providing apparel recommendations, the method comprising:
(a) assigning a body shape profile to a subject;
(b) providing a database of items of apparel, each item scored with a score for one or more defined body shape profiles;
(c) recommending an item of apparel to the subject based on the body shape profile assigned to the subject and the score of the item of apparel for the assigned body shape profile;
(d) said assigning a body shape profile to a subject further comprising:
providing a group of model body shapes defined by vertical guidelines projecting from at least one shoulder of each model body shape of the group; and
selecting a model body shape from the group of model body shapes that accurately represents the subject's body shape.

12. The method of claim 11, said model body shapes further comprising at least one additional variable attribute with a size range divided into three parts of small, medium and large, said variable selected from the group consisting of waist definition, bust size and upper arm size.

13. A method for providing apparel recommendations, the method comprising:
(a) assigning a body shape profile to a subject;
(b) providing a database of items of apparel, each item scored with a score for one or more defined body shape profiles;
(c) recommending an item of apparel to the subject based on the body shape profile assigned to the subject and the score of the item of apparel for the assigned body shape profile;
(d) said assigning a body shape profile to a subject further comprising:
acquiring a digital photograph of a torso of a subject from a digital camera;
overlaying a geometric guide over the photograph of the torso, said geometric guide positioned with a first endpoint positioned at a first shoulder of the torso of the subject with a first edge extending vertically from the first endpoint and a second endpoint positioned at a second shoulder of the torso with a second edge extending vertically from the second endpoint, said second edge parallel to the first edge;
determining a location of outer hip surfaces of the torso in relation to the vertical edges of the geometric guide; and
assigning a body shape classification based on the location of the outer hip surfaces in relation to the vertical edges of the geometric guide.

14. The method of claim 13, said body shape classification further comprising:
analyzing waist definition of the torso of the subject; and
assigning a body shape classification based on the location of the outer hip surfaces in relation to the vertical edges of the geometric guide and the definition of the waist of the torso of the subject.

15. A method for providing apparel recommendations, the method comprising:
(a) identifying human body type attributes;
(b) identifying features of apparel that accentuate or diminish identified body attributes;
(c) assessing body type attributes of a subject; and
(d) recommending items of apparel to the subject based on the assessed body type attributes of the subject and the identified features of apparel for the identified body type attributes;
(e) said assessing body type attributes of the subject further comprising:
providing a group of model body shapes defined by vertical guidelines projecting from at least one shoulder of each body shape of the group; and
selecting a model body shape from the group of body shapes that accurately represents the body attributes of the subject.

16. The method of claim 15, further comprising:
creating a database of apparel with said identified features of apparel that accentuate or diminish identified body attributes; and
recommending items of apparel to the subject from the database.

17. A method for providing apparel recommendations, the method comprising:
(a) identifying human body type attributes;
(b) identifying features of apparel that accentuate or diminish identified body attributes;
(c) assessing body type attributes of a subject; and
(d) recommending items of apparel to the subject based on the assessed body type attributes of the subject and the identified features of apparel for the identified body type attributes;
(e) said body type attribute assessment of the subject further comprising:
acquiring a digital photograph of a torso of the subject from a digital camera;
overlaying a geometric guide over the photograph of the torso, said geometric guide positioned with a first endpoint positioned at a first shoulder of the torso of the subject with a first edge extending vertically from the first endpoint and a second endpoint positioned at a second shoulder of the torso with a second edge extending vertically from the second endpoint, said second edge parallel to the first edge;
determining a location of outer hip surfaces of the torso in relation to the vertical edges of the geometric guide; and
assessing a body shape attribute based on the location of the outer hip surfaces in relation to the vertical edges of the geometric guide.

18. The method of claim 17, said body type attribute assessment of the subject further comprising:
assessing at least one additional variable body attribute with a size range divided into three parts of small, medium and large, said variable selected from the group consisting of waist definition, bust size and upper arm size.

19. The method of claim 13, said assigning a body shape profile to a subject further comprising:
providing a group of model body shapes defined by vertical guidelines projecting from at least one shoulder of each model body shape of the group; and
selecting a model body shape from the group of model body shapes that accurately represents the subject's body shape.

20. The method of claim 19, said model body shapes further comprising at least one additional variable attribute with a size range divided into three parts of small, medium and large, said variable selected from the group consisting of waist definition, bust size and upper arm size.

21. The method of claim 17, said body type attribute assessment of the subject further comprising:
- providing a group of model body shapes defined by vertical guidelines projecting from at least one shoulder of each body shape of the group; and
- selecting a model body shape from the group of body shapes that accurately represents the body attributes of the subject.

* * * * *